United States Patent [19]

Tokiwa et al.

[11] Patent Number: 5,179,510
[45] Date of Patent: Jan. 12, 1993

[54] POWER CONVERTING APPARATUS CAPABLE OF SUPPRESSING A FAULT CURRENT

[75] Inventors: Yukio Tokiwa, Ichihara; Fumitoshi Ichikawa, Urawa; Tadayuki Kitahara, Tokorozawa; Fumio Aoyama, Tokyo, all of Japan

[73] Assignees: The Tokyo Electric Power Company, Incorporated, Tokyo; Kabushiki Kaisha Toshiba, Kawasaki, both of Japan

[21] Appl. No.: 741,073

[22] Filed: Aug. 6, 1991

[30] Foreign Application Priority Data

Aug. 6, 1990 [JP] Japan .................. 2-206715

[51] Int. Cl.⁵ .................................. H02H 7/125
[52] U.S. Cl. .............................. 363/54; 363/58; 363/65; 363/96; 363/129; 363/137
[58] Field of Search ............... 363/54, 57, 58, 65, 363/71, 96, 128, 129, 135, 136, 137

[56] References Cited

U.S. PATENT DOCUMENTS

| | | |
|---|---|---|
| 3,798,530 | 3/1974 | Henderson . |
| 3,832,573 | 8/1974 | Ver Plank et al. .......... 363/57 |
| 4,220,989 | 9/1980 | Perilstein .................. 363/96 |
| 4,488,200 | 12/1984 | Matsuzaki . |
| 4,675,799 | 6/1987 | Suzuki et al. .............. 363/137 |
| 4,720,776 | 1/1988 | Guyeska . |
| 4,805,082 | 2/1989 | Heinrich et al. ............ 363/129 |
| 5,063,338 | 11/1991 | Capel et al. ................ 363/58 |

Primary Examiner—Steven L. Stephan
Assistant Examiner—Jeffrey Sterrett
Attorney, Agent, or Firm—Oblon, Spivak, McClelland, Maier & Neustadt

[57] ABSTRACT

A power converting apparatus comprises self-commutated converter, fault current restricting device, fault detector, and cutoff circuit. Self-commutated converter converts AC power supplied from an AC power system into DC power and supplying the DC power to a common DC circuit, and for converting DC power supplied from the DC circuit into AC power and supplying the AC power to the AC power system. The fault current restricting device is inserted between the self-commutated converted and the DC circuit, and includes a diode provided to permit a DC circuit current to flow from the self-commutated coverter to the DC circuit, and a series circuit having a reactor and a DC power supply and connected in parallel to the diode. The fault detector detects a fault current generated when self-commutated converter is short-circuited. When the fault detector detects a short circuit occurring in self-commutated converter, the cutoff circuit cuts off power supply to that self-commutated converter. With this structure, the DC power supply supplies a circulating current according to a rated current of the self-commutated converter to the reactor and the diode.

12 Claims, 4 Drawing Sheets

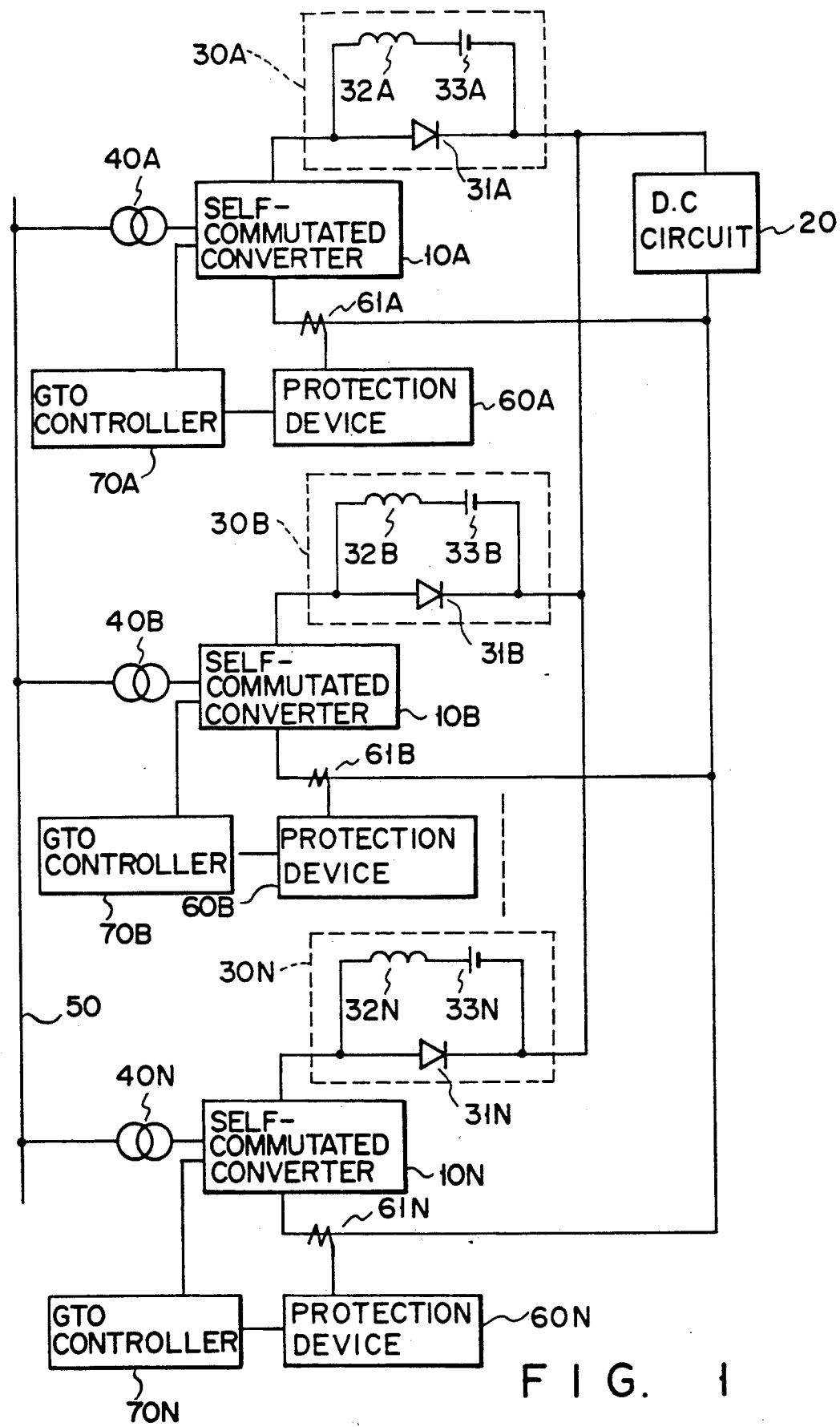
F I G. 1

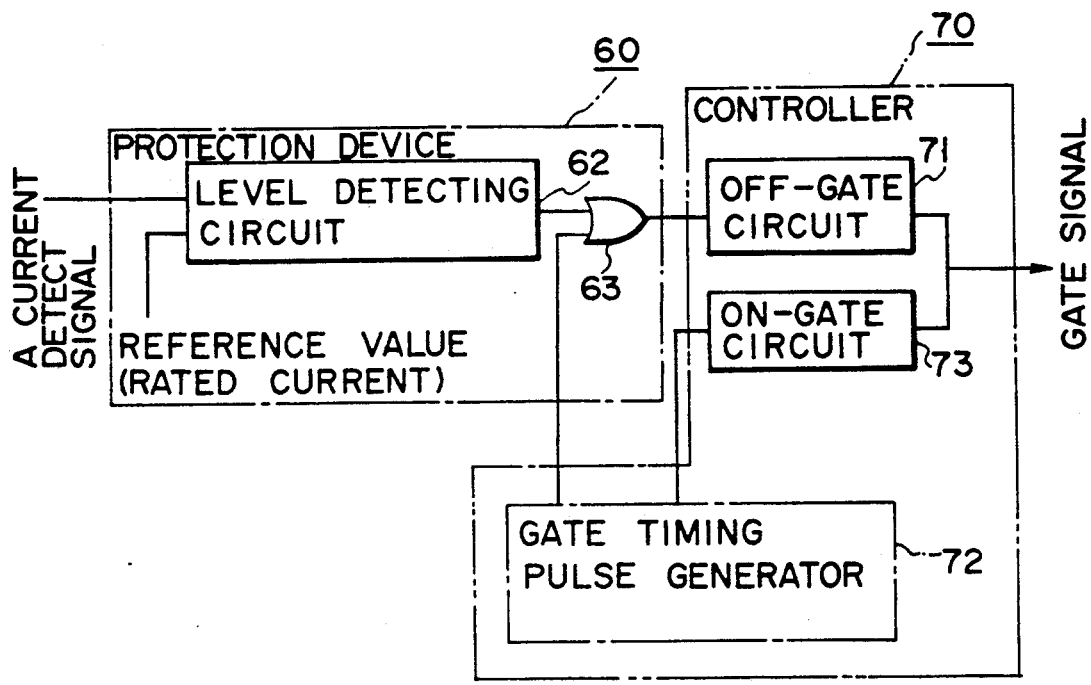
F I G. 2
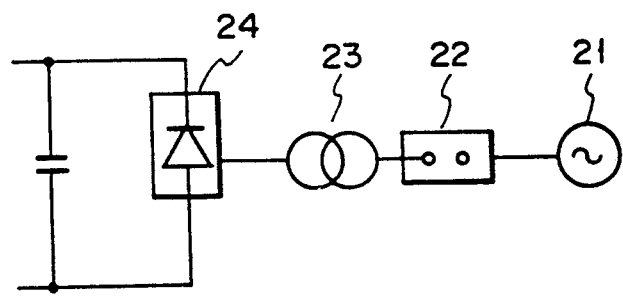
F I G. 3

POWER CONVERTING APPARATUS CAPABLE OF SUPPRESSING A FAULT CURRENT

BACKGROUND OF THE INVENTION

1. Field of the Invention

The present invention relates to a power converting apparatus comprising a single or a plurality of selfcommutated power converters (hereafter referred to as "self-commutated converters") in common with a DC circuit, using a self turn-off type semiconductor device (hereafter referred to as "self turn-off device"). More particularly, the present invention pertains to a power converting apparatus which can suppress a fault current which occurs when DC short circuit occurs in any self-commutated converter.

2. Description of the Related Art

There are various methods to interrupting the current caused by when a DC short circuit occurs in a self-commutated converter.

The first method is to use fuses. According to this method, a fuse is inserted in series with each self turn-off device into the circuit of the self-commutated converter comprising multiple self turn-off devices to thereby cut off the fault current by the fuse when melted.

As the second method, the self turn-off function (current interrupting function) of the self turn-off device is utilized to cut off the fault current.

FIG. 6 illustrates the arrangement of the self-commutated converter using a gate turn off thyristor (GTO) as its self turn-off device.

A self-commutated converter 10 comprises GTOs 11V to 11Z and diodes 12U to 12Z which are connected in parallel in the reverse direction to the respective GTOs. The DC terminal of the self-commutated converter 10 is connected to a DC circuit 20, while the AC terminal is connected to an AC system 50 through a transformer 40.

Suppose that the GTO 11X is short-circuited due to some reason while the GTO 11U is conductive. Then, an excessive fault current flows to the GTOs 11U and 11X to cause a DC short circuit. A protection device (not shown) detects the fault current which flows through the GTOs 11U and 11X, and provides a gate disable signal to the GTO 11U which is normally activated. As a result, the fault current which tends to flow between the GTOs 11U and 11X is cut off by the GTO 11U, thus protecting the self-commutated converter 10.

The first method is available for a low-voltage circuit involving a DC voltage of 1 kV or lower; however, when the circuit voltage rises above the level, this method is not applicable because of no fuses available for such a high voltage.

In the second method, the current-increase factor di/dt of the fault current is very large. When the protection device detects the fault current, then provides the gate disable signal to the GTO, therefore, the value of the current flowing in the GT is already beyond the value where the GTO can be rendered off. If the GTO is forced to be turned off under such conditions, the GTO itself may be damaged, simplifying the fault.

SUMMARY OF THE INVENTION

It is therefore an object of the present invention to provide a power converting apparatus which can suppress the current-increase factor di/dt of a fault current without deteriorating a transient response in normal operation, and can cut off the fault current without damaging a self turn-off device.

It is another object of the present invention to provide a power converting apparatus which can cut off a fault current without using any fuse, and is applicable to circuits from a low-voltage circuit to a high-voltage one.

To achieve the first and second objects, a power converting apparatus according to the present invention comprises self-commutated converter for converting AC power supplied from an AC power system into DC power and supplying the DC power to a DC circuit, and for converting DC power supplied from the DC circuit into AC power and supplying the AC power to the AC power system; fault current restricting device connected between the self-commutated converter and the DC circuit and including a diode for permitting a DC circuit current to flow from the self-commutated converter to the DC circuit, and a series circuit having a reactor and a DC power supply and connected in parallel to the diode; and a protection device for detecting the DC circuit current in the self-commutated converter and controlling activation of the self-commutated converter in accordance with a value of the detected DC circuit current, whereby the DC power supply supplies a circulating current according to a rated current of the self-commutated converter to the reactor and the diode.

According to the above-structured power converting apparatus of the present invention, when a DC short circuit occurs in the self-commutated converter, the diode blocks a fault current, which then flows through the reactor into the self-commutated converter. Since the reactor serves to control the current-increase factor of the fault current, it takes some time for the value of the fault current flowing in the self-commutated converter to reach the level beyond which the self turn-off device can no longer shield the current after the occurrence of the fault. It is not therefore late to send a gate disable signal to the self turn-off device, even after the protection device detects the fault current, to cut off the fault current in the self-commutated converter, thus preventing the self-commutated converter from malfunctioning.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram of a power converting apparatus according to the first embodiment of the present invention;

FIG. 2 is a diagram illustrating the structure of a protection device;

FIG. 3 is a diagram showing the structure of a DC circuit;

DETAILED DESCRIPTION OF THE PREFERRED EMBODIMENT

Preferred embodiments of the present invention will now be described referring to the accompanying drawings.

Figure 6:
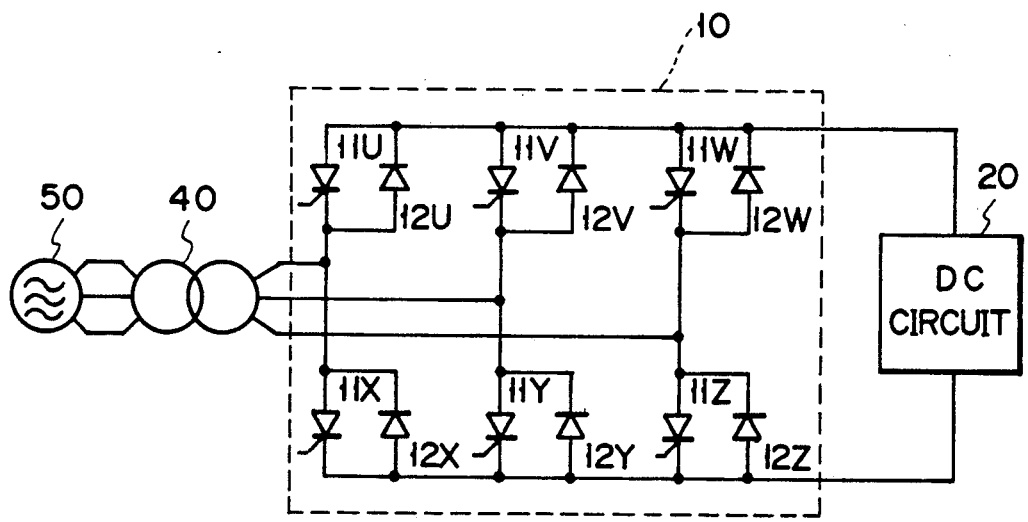
FIG. 6 is a diagram showing the structure of a conventional self-commutated converter.

FIG. 1 illustrates a power converting apparatus according to the first embodiment of the present invention. The power converting apparatus includes a plurality of self-commutated converters 10A to 10N. The DC terminals of the self-commutated converters 10A to 10N are connected to a common DC circuit 20, while the AC terminals are connected to an AC power system 50 respectively through transformers 40A to 40N. The self-commutated converters 10A to 10N are designed the same as the self-commutated converter shown in FIG. 6.

Fault current restricting devices 30A to 30N are inserted between the individual self-commutated converters 10A to 10N and the DC circuit 20, respectively.

The fault current restricting device 30A comprises a diode 31A to be inserted between the self-commutated converter 10A and the DC circuit 20 in the direction to allow the current from the converter 10A to flow to the DC circuit 20, and a series circuit including a reactor 32A and a DC power supply 33A and connected in parallel to the diode 31A.

The other fault current restricting devices 30B to 30N are designed the same as the fault current restricting device 30A.

Protection devices 60A to 60N and GTO controller 70A to 70N are provided in the respective self-commutated converters 10A to 10N. The DC circuit currents flowing in the self-commutated converters 10A to 10N are detected by current detectors 61A to 61N provided for the respective self-commutated converters 10A to 10N.

FIG. 2 illustrates the structure of the protection device 60A and GTO controller 70A.

The protection device 60A supplies a current detect signal indicating the detected current of the self-commutated converter 10A to level detecting circuit 62. The level detecting circuit 62 compares the value of the current detect signal with a reference value corresponding to the rated current for the self-commutated converter 10A. When the value of the current detect signal exceeds the reference value, the level detecting circuit 62 supplies a fault detect signal to an OR circuit 63.

The protection device 60A uses an off-gate circuit 71 in the controller 70A to provide a gate disable signal to the GTO. The controller 70A comprises the off-gate circuit 71, a gate timing pulse generator 72, and an on-gate circuit 73. The gate timing pulse generator 72 sends a gate enable command and a gate disable command in accordance with the specified value of the DC circuit current, the specified power value, and so forth for the self-commutated converter 10A. The off-gate circuit 71 sends a gate disable signal to the GTO in response to the gate disable command. The on-gate circuit 73 sends gate enable signal to the GTO in response to the gate enable command.

FIG. 3 shows the structure of the DC circuit 20, which has an AC power supply 21 connected to a semiconductor rectifier 24 through a circuit breaker 22 and a transformer 23.

The operation of this embodiment with above-described structure will now be explained.

According to this embodiment, provided that the self-commutated converters 10A to 10N have the same capacity, and their rated current is set Ido, the voltage of the DC power supply 33A is controlled so that a circulating current Ib flowing through a closed circuit from the DC power supply 33A, to the reactor 32A, to the diode 31A, back to the DC power supply 33A is slightly greater than the rated current Ido. The same is true of the other fault current restricting devices 30B through 30N.

Suppose that the self-commutated converters 10A to 10N are currently in forward conversion mode to convert AC power from the AC power system 50 into DC power. When the self-commutated converters 10A to 10N are functioning normally, the DC circuit current Id in the self-commutated converters 10A to 10N becomes smaller than the rated current Ido, and the current flowing in each of the diodes 31A to 31N of the respective fault current restricting devices 30A to 30N becomes almost equal to (circulating current Ib +DC circuit current Id).

When the self-commutated converters 10A to 10N are in reverse conversion mode to convert the DC power from the DC circuit 20 into the AC power, the current flowing across each of the diodes 31A to 31N is almost equal to (circulating current Ib −DC circuit current Id).

If a DC short circuit occurs in any of the self-commutated converters 10A to 10N under the above operating conditions, the fault current tends to flow from other properly operating self-commutated converters and the DC circuit 20 toward the short-circuited self-commutated converter. This fault current is significantly greater than the rated current Ido. The fault current tends to flow, in the reverse direction, across the diode in the fault current restricting device corresponding to the malfunctioning self-commutated converter. The diode however blocks the current flow the reverse direction. The fault current then flows to the reactor connected in parallel to the diode. Since the reactor originally serves to suppress the current, the current-increase factor of the fault current, di/dt, is suppressed.

The protection device 60 generates a fault detect signal when the DC short circuit occurs, and sends this signal as the gate disable signal via the OR circuit 63 to the off-gate circuit 71. As a result, the off-gate circuit 71 sends the gate disable signal to the other properly operating GTOs, cutting off the fault current.

As the reactor has suppressed the current-increase factor of the fault current, di/dt, the value of the fault current is small enough when the protection device 60 sends the gate disable signal to the GTOs, so that the GTOs will not be damaged.

Since the DC circuit current flows not through the reactor in the steady operation, preventing the transient response of the self-commutated converters from being deteriorated.

According to this embodiment as described above, a constant current flows to the reactor in the fault current restricting device in the normal operation, while the reactor prevents an increase in the fault current when some self-commutated converter malfunctions. It is therefore possible to suppress the increase factor of the fault current without impairing the transient response of the self-commutated converter.

The suppression on the increase factor of the fault current saves enough time to turn off the properly functioning GTOs. Accordingly, the fault current can be cut off without damaging the GTOs.

Further, fuses for protecting against overcurrent need not be used, and the power converting apparatus of the present invention is therefore applicable to a wide variety of voltage circuits from a low-voltage circuit involving a voltage of 1 kV or less to a high-voltage circuit involving a voltage of over 10 kV.

The second embodiment of the present invention will now be described.

Figure 4:
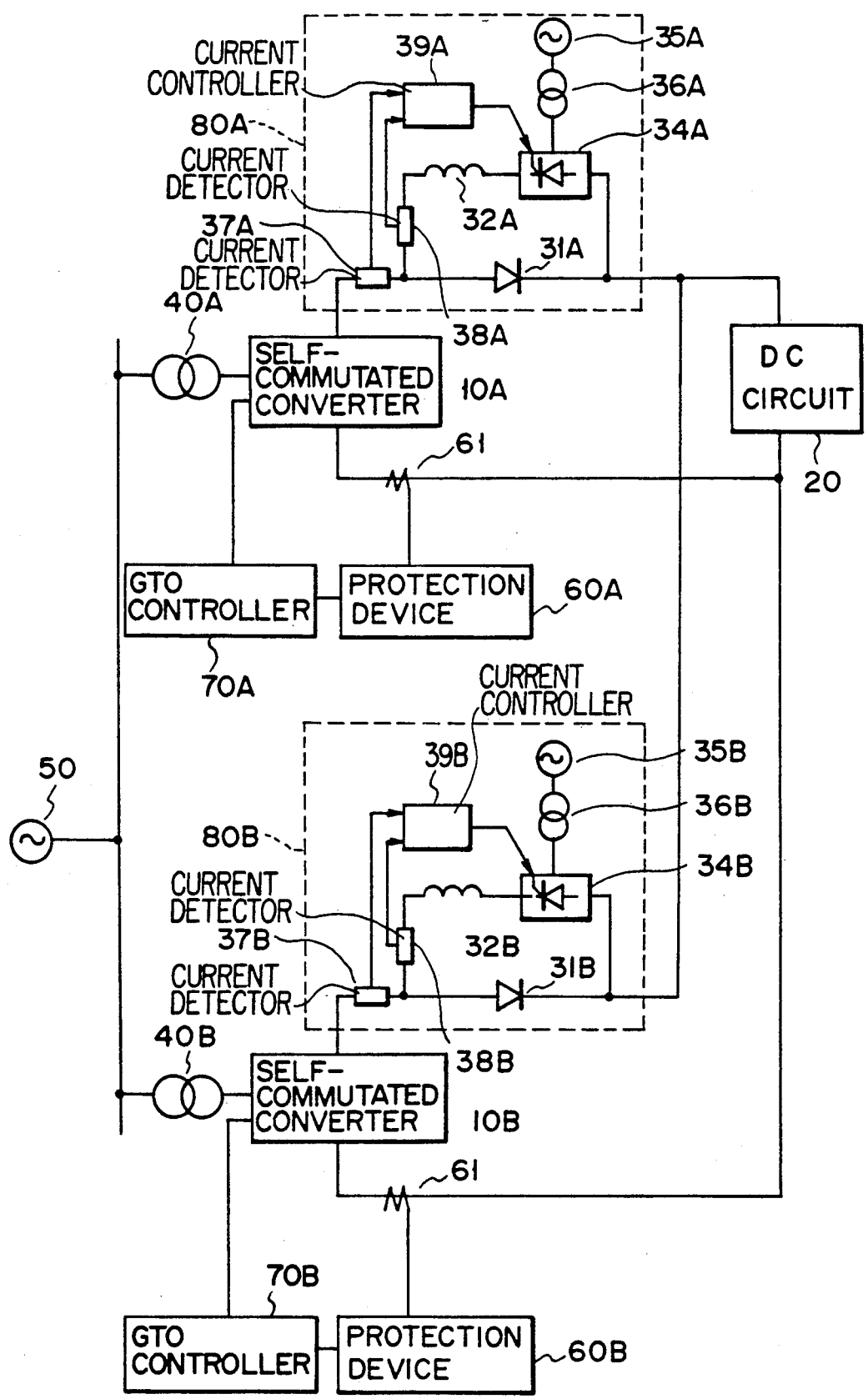
FIG. 4 is a block diagram of a power converting apparatus according to the second embodiment of the present invention.

FIG. 4 illustrates the functional blocks of a power converting apparatus according to this embodiment.

The second embodiment is the first embodiment whose fault current restricting device is modified.

Fault current restricting devices 80A and 80B in this embodiment respectively comprise thyristor rectifiers 34A and 34B as DC power supplies, auxiliary power supplies 35A and 35B, transformers 36A and 36B, current detectors 37A and 37B, current detectors 38A and 38B, and circulating current controllers 39A and 39B. The transformers 36A and 36B transform voltages from the auxiliary power supplies 35A and 35B and apply them to the thyristor rectifiers 34A and 34B, respectively. The current detectors 37A and 37B respectively detect the DC circuit currents in the self-commutated converters 10A and 10B. The current detectors 38A and 38B detect the circulating current. The circulating current controllers 39A and 39B receive the detected values of the DC circuit current and the circulating current, and control the firing angles for the thyristor rectifiers 34A and 34B.

Figure 5:
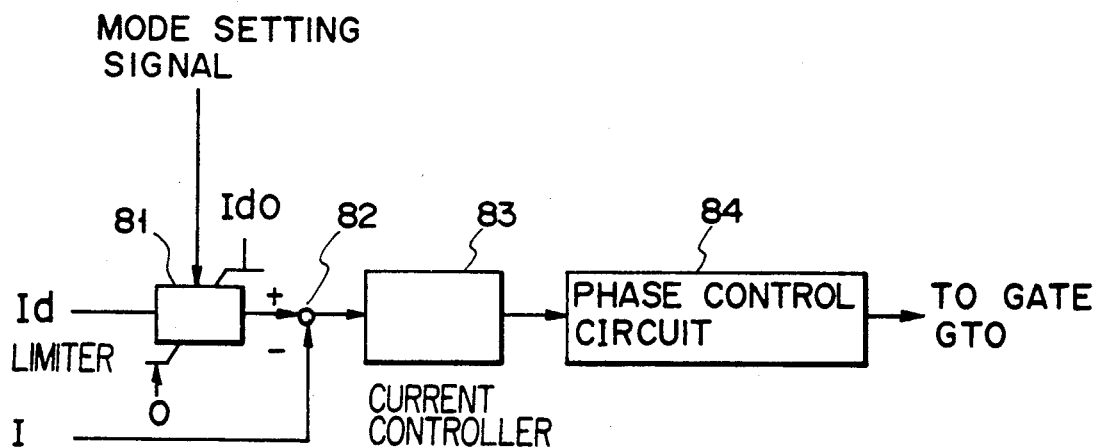
FIG. 5 is a diagram illustrating the structure of a circulating current controller.

FIG. 5 illustrates the structure of the circulating current controller 39A or 39B.

It is to be noted that the direction of the DC circuit current Id in the self-commutated converter 10A or 10B is considered to be forward in the reverse conversion, so that the DC circuit current is treated to have a negative value in the forward conversion.

In each of the circulating current controllers 39A and 39B, a limiter 81 receives the detected signal from the associated current detector 37A or 37B indicating the DC circuit current Id. Each limiter 81 also receives a mode setting signal indicating the conversion mode of the associated self-commutated converter, and changes its limit value between in the forward conversion and in the reverse conversion. The limiter 81 sets the limit value to "0" in the forward conversion, while setting the limit value to the rated current Ido in the reverse conversion. As far as the received detect signal of the DC circuit current Id has a value below the limit, the limiter 81 outputs the value of the signal as the specified value of the circulating current. When the DC circuit current Id reaches the limit, the limiter 81 holds the specified value of the circulating current at the limit value.

In other words, even if the value of the current increases by the fault current, the specified circulating current value can be held at "0" in the forward conversion. In the reverse conversion, the specified circulating current value is held at the value of the rated current Ido even though the fault current increases the value of the current.

A subtractor 82 performs subtraction on the specified circulating current value from the limiter 81 and the detected signal of the circulating current Ib detected by the associated current detector 38A or 38B, and sends the resultant value to a current controller 83. The current controller 83 outputs a control signal in accordance with the received value, i.e., the difference between the specified value and the actually detected value of the circulating current. A phase control circuit 84 outputs a firing pulse of the associated thyristor rectifier 34A or 34B in accordance with the control signal sent from the current controller 83.

The operation of the second embodiment having the above-described arrangement will be described below.

In the individual fault current restricting devices 80A and 80B, the specified circulating current value or the output of the limiter 81 is limited to zero in the forward conversion and is limited to equal to or below the rated current Ido in the reverse conversion in accordance with the DC circuit current value Id in the associated self-commutated converter 10A or 10B. The circulating current Ib is subjected to constant-current control by the subtractor 82, current controller 83 and phase control circuit 84 to have a value equal to the specified circulating current value.

In other words, the circulating current Ib becomes zero in the forward conversion and becomes equal to the rated current Ido in the reverse conversion.

When a DC short circuit occurs in either the self-commutated converter 10A or 10B and the DC circuit current Id in that short-circuited converter increases, the limiter 81 functions to limit the circulating current Ib to the limit value. In particular, when the short circuit occurs in the reverse conversion, the fault current flowing through the reactor 32A or 32B is considered as the circulating current and is to be limited to the rated current Ido. The effect of suppressing the current-increase factor of the fault current is therefore further enhanced as compared with the case involving only the reactor.

As this embodiment works as described above, the circulating current follows up the DC circuit current of the self-commutated converters as well as the effect of suppressing the fault current is improved. It is therefore possible to prevent the unnecessary current from flowing through the self-commutated converters, thus reducing the power loss as much as possible.

While a self-commutated converter is provided for each fault current restricting device in the first and second embodiments, a plurality of self-commutated converters may share a single fault current restricting device.

More specifically, individual self-commutated converters each have one end connected to one terminal of a common DC circuit and the other terminal connected the anode terminal of the diode in a single fault current restricting device, with the other terminal of the DC circuit connected to the cathode terminal of the fault current restricting device.

A value obtained by converting the specified value of the DC circuit current in the self-commutated converter or the specified power value may be used as the specified value of the circulating current.

While the self-commutated converters in the first and second embodiments are designed to be able to selectively perform the forward conversion and the reverse conversion, the present invention may be applied to a power converting apparatus which comprises selfcommutated converters designed to perform only the forward conversion or reverse conversion.

In addition, while the individual embodiments have been described as having a plurality of self-commutated converters, the present invention can also be applied to a power converting apparatus comprising a single self-commutated converter.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A power converting apparatus comprising:
    self-commutated converter means having DC terminal connected to a DC circuit for performing at least one of a conversion of DC power to AC power and a conversion of the AC power to the DC power;
    fault current restricting means, connected between said self-commutated converter means and said DC circuit and including a unidirectional rectifying element for permitting a DC circuit current to flow from said self-commutated converter means to said DC circuit, and a series circuit having a reactor and a DC power supply and connected in parallel to said rectifying element; and
    protection means for detecting said DC circuit current in said self-commutated converter means and controlling said self-commutated converter means in accordance with a value of said detected DC circuit current to prevent an excess current from flowing through said self-commutated converter means, whereby said DC power supply supplies a circulating current according to a rated current for said self-commutated converter means to said reactor and said rectifying element.

2. A power converting apparatus according to claim 1, wherein said fault current restricting means further includes constant-current control means for holding said circulating current to a predetermined current value.

3. A power converting apparatus according to claim 2, wherein said DC power supply includes a thyristor rectifier; and
    said constant-current control means includes:
    DC circuit current detecting means for detecting said DC circuit current in said self-commutated converter means;
    circulating current detecting means for detecting said circulating current flowing through said reactor; and
    circulating current control means for generating a firing signal to control a firing angle of the thyristor rectifier in accordance with a value of the DC circuit current detected by said DC circuit current detecting means and a value of said circulating current detected by said circulating current detecting means.

4. A power converting apparatus according to claim 3, wherein said circulating current control means includes:
    limiter receiving the DC circuit current from said DC circuit current detecting means for outputting a value of said DC circuit current as a specified circulating current value, limiting said circulating current value in close proximity to zero at a time of an AC-to-DC conversion, and limiting said circulating current value in close proximity to a value of said rated current at a time of a DC-to-AC conversion, when said DC circuit current in said DC-to-AC conversion flows in a direction from said DC circuit toward said self-commutated converter means;
    subtractor for calculating a difference between said specified circulating current value from said limiter and said circulating current value detected by said circulating current detecting means; and
    a phase controller for controlling said firing angle of said thyristor rectifier in accordance with said difference output from said subtractor.

5. A power converting apparatus according to claim 1, wherein said protection device includes:
    current detecting means for detecting said DC circuit current in said self-commutated converter means;
    a comparator for comparing a value of said DC circuit current detected by said current detecting means with a reference value and outputting a fault detect signal when said DC circuit current value exceeds said reference value; and
    cutoff means for cutting off current to said self-commutated converter means by outputting to said self-commutated converter means a cutoff signal generated by a gate control means when said fault detect signal is output.

6. A power converting apparatus according to claim 1, wherein said unidirectional rectifying element includes a diode.

7. A power converting apparatus according to claim 1, wherein said self-commutated converter means comprises a plurality of self turn-off devices.

8. A power converting apparatus comprising:
    a plurality of self-commutated converters each having a DC terminal connected to a common DC circuit;
    at least one fault current restricting means inserted between said self-commutated converters and said DC circuit and including a unidirectional rectifying element for permitting a DC circuit current to flow from each of said self-commutated converters to said DC circuit, and a series circuit having a reactor and a DC power supply and connected in parallel to said rectifying element; and
    a plurality of protection circuits for respectively detecting said DC circuit currents in said self-commutated converters and controlling said self-commutated converters respectively in accordance with values of said detected DC circuit currents to prevent an excess current from flowing through said self-commutated converters, whereby said DC power supply supplies a circulating current according to a rated current for said self-commutated converters to said reactor and said rectifying element.

9. A power converting apparatus according to claim 8, wherein said fault current restricting means is provided for each of said self-commutated converters.

10. A power converting apparatus according to claim 8, wherein said fault current restricting means further includes constant-current control means for holding said circulating current to a predetermined current value.

11. A power converting apparatus according to claim 10, wherein said DC power supply includes a thyristor rectifier; and
    said constant-current control means includes:

DC circuit current detecting means for detecting a DC circuit current in each of said self-commutated converters;

circulating current detecting means for detecting said circulating current flowing through said reactor; and circulating current control means for generating a firing signal to control a firing angle of said thyristor rectifier in accordance with a value of the DC circuit current detected by said DC circuit current detecting means and a value of said circulating current detected by said circulating current detecting means.

12. A power converting apparatus according to claim 11, wherein said circulating current control means includes:

a limiter receiving the DC circuit current from said DC circuit current detecting means for outputting a value of a DC circuit current as a specified circulating current value, limiting said circulating current value in close proximity to zero at a time of a DC-to-AC conversion, and limiting said circulating current value in close proximity to a value of said rated current at a time of an AC-to-DC conversion, when said DC circuit current in said DC-to-AC conversion flow in a direction from said DC circuit toward said self-commutated converter;

subtractor for calculating a difference between said specified circulating current value from said limiter and said circulating current value detected by said circulating current detecting means; and a phase controller for controlling said firing angle of said thyristor rectifier in accordance with said difference output from said subtractor.

* * * * *